United States Patent
Komori et al.

(10) Patent No.: US 7,921,083 B2
(45) Date of Patent: Apr. 5, 2011

(54) FILE MANAGEMENT DEVICE AND ELECTRONIC EQUIPMENT

(75) Inventors: Hiroyuki Komori, Kawasaki (JP); Yuya Tagami, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 317 days.

(21) Appl. No.: 11/651,035

(22) Filed: Jan. 9, 2007

(65) Prior Publication Data
US 2007/0299884 A1 Dec. 27, 2007

(30) Foreign Application Priority Data
Jun. 26, 2006 (JP) .................... 2006-175295

(51) Int. Cl.
*G06F 17/00* (2006.01)
(52) U.S. Cl. .................. 707/679; 707/821; 707/822
(58) Field of Classification Search .................. None
See application file for complete search history.

(56) References Cited

U.S. PATENT DOCUMENTS

| 5,926,821 | A * | 7/1999 | Hirose et al. | 707/202 |
| 6,446,091 | B1 * | 9/2002 | Noren et al. | 707/202 |
| 6,615,224 | B1 * | 9/2003 | Davis | 707/202 |

FOREIGN PATENT DOCUMENTS

| JP | 64-19443 | 1/1989 |
| JP | 3-22152 | 1/1991 |
| JP | 8-227372 | 9/1996 |

OTHER PUBLICATIONS

Chinese Office Action dated Jan. 8, 2010 issued in corresponding China Patent Application No. 200710003225.2.

* cited by examiner

*Primary Examiner* — Hung Q Pham
(74) *Attorney, Agent, or Firm* — Staas & Halsey LLP

(57) ABSTRACT

A file management device for a control system, has a file write unit which records data of a file into cluster areas of a recording medium, records file information into a directory area of recording medium, and records FAT chain information into FAT of recording medium; a file delete unit which stores file restoration information having the file information and FAT chain information into a memory area, sends back a restoration descriptor for identifying the file restoration information to control system, and deletes the file information and FAT chain information in recording medium; and a file restoration unit which reads data of deleted file from the recording medium based on the file restoration information and sends the data back to control system, and restores the file information and FAT chain information in the recording medium based on the file restoration information of the file selected by the control system.

18 Claims, 9 Drawing Sheets

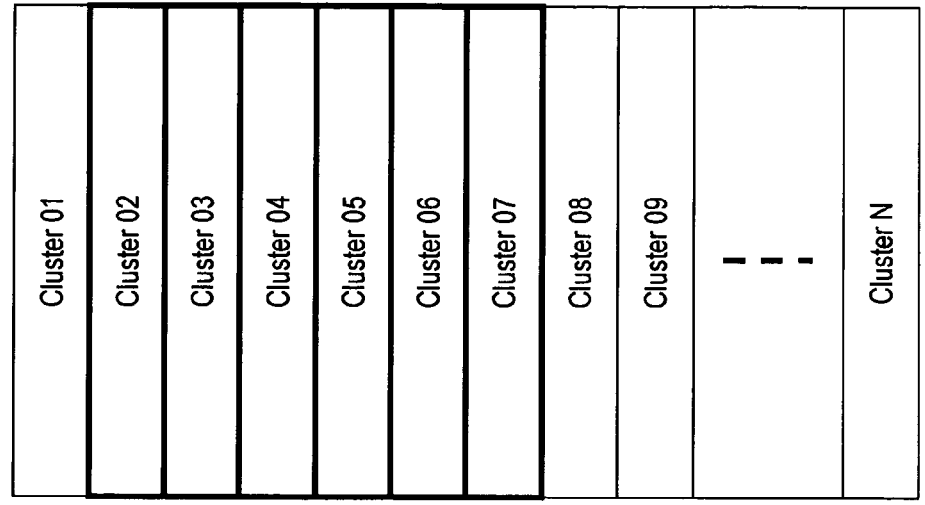
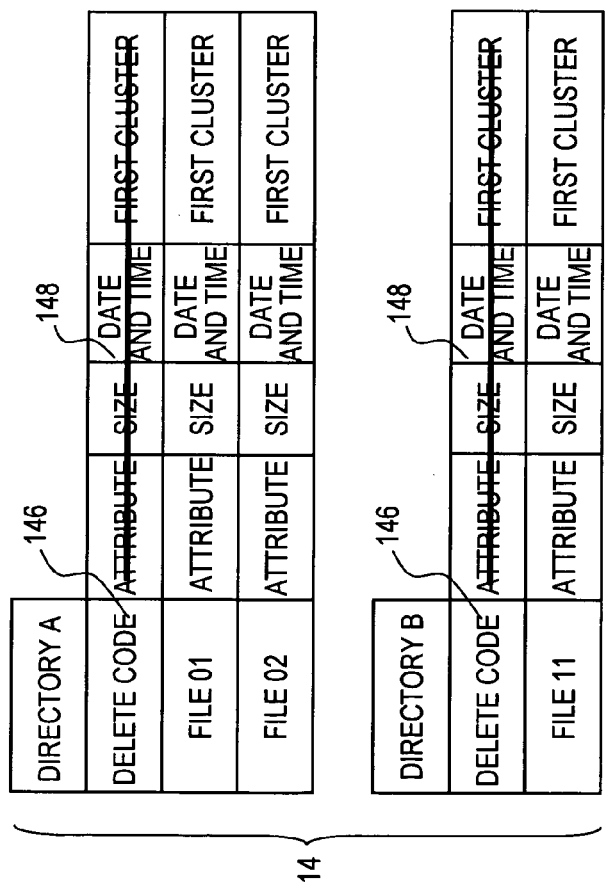
FIG.5

FILE MANAGEMENT DEVICE AND ELECTRONIC EQUIPMENT

CROSS-REFERENCE TO RELATED APPLICATIONS

This application is based upon and claims the benefit of priority from the prior Japanese Patent Application No. 2006-175295, filed on Jun. 26, 2006, the entire contents of which are incorporated herein by reference.

BACKGROUND OF THE INVENTION

1. Field of the Invention

The present invention relates to a file management device and electronic equipment that can restore a deleted file, and more particularly to a file management device and electronic equipment in which a user can specify a restored file based on the contents of the file.

2. Description of the Related Art

Electronic equipment, such as a digital still camera and video camera, has a camera control system and a file system (file management device) for managing such a file as image data, wherein the file system writes, reads or deletes file data in a recording medium in response to a write request, read request or delete request from the control system. A portable music player, which is popular lately, also has a music reproducing control system and a file system (file management device) for managing the files of voice data, where similar file management is performed.

In a file system, it has been proposed that after data of a file is deleted from a recording medium in response to a delete request, the deleted data is restored in response to a restoration request (e.g. see Japanese Patent Application Laid-Open No. H01-019443 and No. H03-022152).

According to these patent documents, file management information is recorded as deleted file management information in response to a delete request, and the file management information is restored based on the deleted file management information of a specified file name in response to a restoration request which specifies the deleted file name. In this case, the FAT chain information in the file allocation table (FAT) is deleted in response to the delete request, but overwrite is disabled.

SUMMARY OF THE INVENTION

The above mentioned file system that can restore a deleted file is used for a computer system having a user interface, such as a keyboard and display device, so the user must specify a file name to request restoration. Therefore the user requests restoration of a deleted file recognizing the file name of the data.

However in the case of the above mentioned digital still camera and portable music player, for example, a user interface has a certain limitation, and the user manages files based on the contents of the data without recognizing the file name of the data. For example, in the case of a digital still camera, a file name of the data is provided by the camera control system, but file management by the user is performed based on the thumbnail images reproduced on a small monitor screen. In the case of a portable music player as well, when voice data from podcasting is restored, the contents thereof cannot always be confirmed by the file name, so the voice data may be restored based on the reproduced sound of the music data. Therefore it is inappropriate to have the user specify a file name when restoration of a deleted file is requested, since the user does not recognize the file name.

With the foregoing in view, it is an object of the present invention to provide a file management device which allows a user to restore a deleted file based on the contents without recognizing the file name.

To achieve the above objects, a first aspect of the present invention provides a file management device for managing data of a file in response to a request from a control system, having: a file write unit which, in response to a write request, records data of a file to be written, into one or a plurality of cluster areas of a recording medium, records file information having at least a file name and attribute information into a directory area of the recording medium, and records file data area information to indicate a cluster or clusters, in which the data of the file is recorded, into a data area management table of the recording medium; a file delete unit which, in response to a delete request, stores file restoration information having the file information and the file data area information into a memory area, sends back a restoration descriptor for identifying the file restoration information to the control system, and deletes the file information and the file data area information in the recording medium; and a file restoration unit which, in response to a restoration request, reads data of a deleted file from the recording medium based on the file restoration information corresponding to the restoration descriptor and sends the data back to the control system, and restores the file information and file data area information in the recording medium based on the file restoration information of the selected file in response to the selection of a restoration file from the control system.

According to the first aspect, the file restoration unit reads the data of a deleted file based on the file restoration information and sends the data back to the control system in response to the restoration request, so the control system can reproduce data of the file and prompt the user to select the restoration file. Therefore restoration of a file can be requested based on the contents of the data without specifying the file name.

To achieve the above object, a second aspect of the present invention provides an electronic equipment having a control system for controlling an application, and a file management device for managing data of a file in response to a request from the control system, wherein the file management device has a file write unit which, in response to a write request, records data of a file to be written, into one or a plurality of cluster areas of a recording medium, records file information having at least a file name and attribute information into a directory area of the recording medium, and records file data area information to indicate a cluster or clusters, in which the data of the file is recorded, into a data area management table of the recording medium; a file delete unit which, in response to a delete request, stores file restoration information having the file information and the file data area information into a memory area, sends back a restoration descriptor for identifying the file restoration information to the control system, and deletes the file information and the file data area information in the recording medium; and a file restoration unit which, in response to a restoration request, reads data of a deleted file from the recording medium based on the file restoration information corresponding to the restoration descriptor and sends the data back to the control system, and restores the file information and the file data area information in the recording medium based on the file restoration information of the selected file in response to the selection of a restoration file from the control system, and in the restoration processing, the control system reproduces data of the deleted file sent back from the file management device and prompts a user to select a restoration file, and notifies the selected restoration file to the file management device in response to the selected input.

According to the above mentioned aspects of the invention, if a file restoration request is generated, the file management device reads the data of the restoration candidate file and transfers it to the control system, so the user can select the restoration file based on the contents of the data.

BRIEF DESCRIPTION OF THE DRAWINGS

FIG. 5 shows the status inside the recording medium after delete;

DESCRIPTION OF THE PREFERRED EMBODIMENTS

Embodiments of the present invention will now be described with reference to the drawings. The technical scope of the present invention, however, is not limited to these embodiments, but covers the contents of claims and equivalents thereof.

Terms used in the present embodiment have the following correspondence with the terms used in the claims.
File Allocation Table (FAT): data area management table
FAT chain information: file data area information
Entry information: file information
A cluster means a block area in the memory in which the file data is stored.

Figure 1:
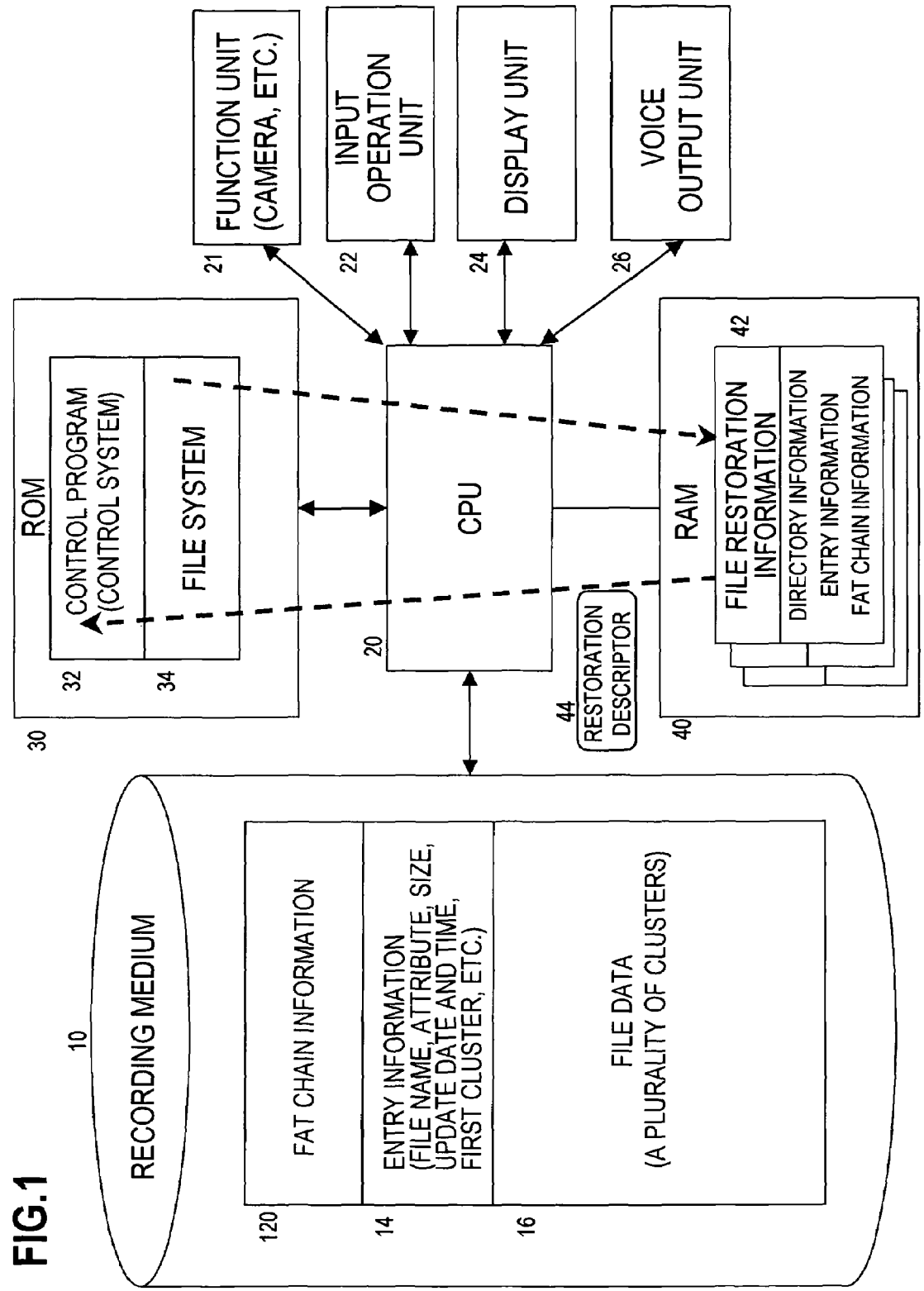
FIG. 1 is a diagram depicting a configuration of the electronic equipment according to the present embodiment.

FIG. 1 is a diagram depicting the configuration of the electronic equipment according to the present embodiment. Electronic equipment is portable electronic equipment, such as a digital still camera and a portable music player, and the function unit 21, such as a camera function unit, to implement these functions, is controlled by the control program 32 in the program ROM 30 and CPU 20. The image data captured by the function unit 21 is written, read, deleted or restored in the recording medium 10 by the file system 34 in the program ROM 30 and CPU 20. The electronic equipment has an input operation unit 22 which is operated by the user, a display unit 24 for displaying images of the image data and displaying the user interface for supporting input operation, and a voice output unit 26 for reproducing voice of the voice data.

The recording medium 10 is a memory card or hard disk, for example, and is a non-volatile memory which maintains data even if power is turned OFF. The file system 34 in the program ROM 30 is a management program for managing files in the recording medium 10, and functions as a file management system by the CPU 20 executing the file system 34.

In the case of the digital still camera, for example, in response to the input operation from the input operation unit 22, the control program 32 controls the function unit 21, and requests the file system 34 to write image data captured by the function unit 21 to the recording medium 10. Also in response to the operation input from the input operation unit 22, the control program 32 requests the file system 34 to read the specified file, and displays the image data of the read file on the display unit 24. Or reproduces the voice data of the read file through the voice output unit 26.

Also in response to the input operation from the input operation unit 22, the control program 32 also requests the file system to delete a file or restore a deleted file. Therefore a control system of electronic equipment is implemented by the CPU 20 and the control program 32 executed by CPU.

When the file system 34 records a write target file into the recording medium 10 in response to the write request of a file from the control program 32, the file system 34 writes the entry information of the file to the directory area 14, writes the data of the file to one or a plurality of cluster areas in the data area 16, and writes FAT chain information to indicate the cluster in which the data was written to the file allocation table (FAT) 120.

Also in response to the read request of a file from the control program 32, the file system 34 reads the data from a cluster or clusters corresponding to the FAT chain information in the data area 16 based on the entry information and FAT chain information of the specified file. And in response to the delete request of a file from the control program 32, the file system 34 deletes the entry information and FAT chain information of the file. At this time, the file restoration information 42 of the deleted file is recorded in the RAM 40. The file restoration information 42 includes directory information, entry information and FAT chain information, as described later, and also includes information required to restore the entry information and FAT chain information of a file to original status when the file is restored. This is the function of the file delete unit.

This RAM 40 is a volatile memory which maintains data during power ON, but may be a non-volatile memory. This file system 34 notifies the restoration descriptor 44 for uniquely identifying the file restoration information 42 to the control program 32.

Also in response to the restoration request of a deleted file from the control program 32, the file system 34 reads data of a deleted file from the data area 16 based on the file restoration information 42, and transfers it to the control program 32. And in response to the selection of the restoration file from the control program, the file system 34 restores the entry information and FAT chain information of the selected deleted file from the file restoration information 42, and records it to the recording medium 10. This can restore the deleted file. The control program 32 specifies the restoration identifier 44 notified from the file system when the file delete processing is performed, and requests the file system 34 to read the data of the deleted file. This is the function of the file restoration unit.

Figure 2:
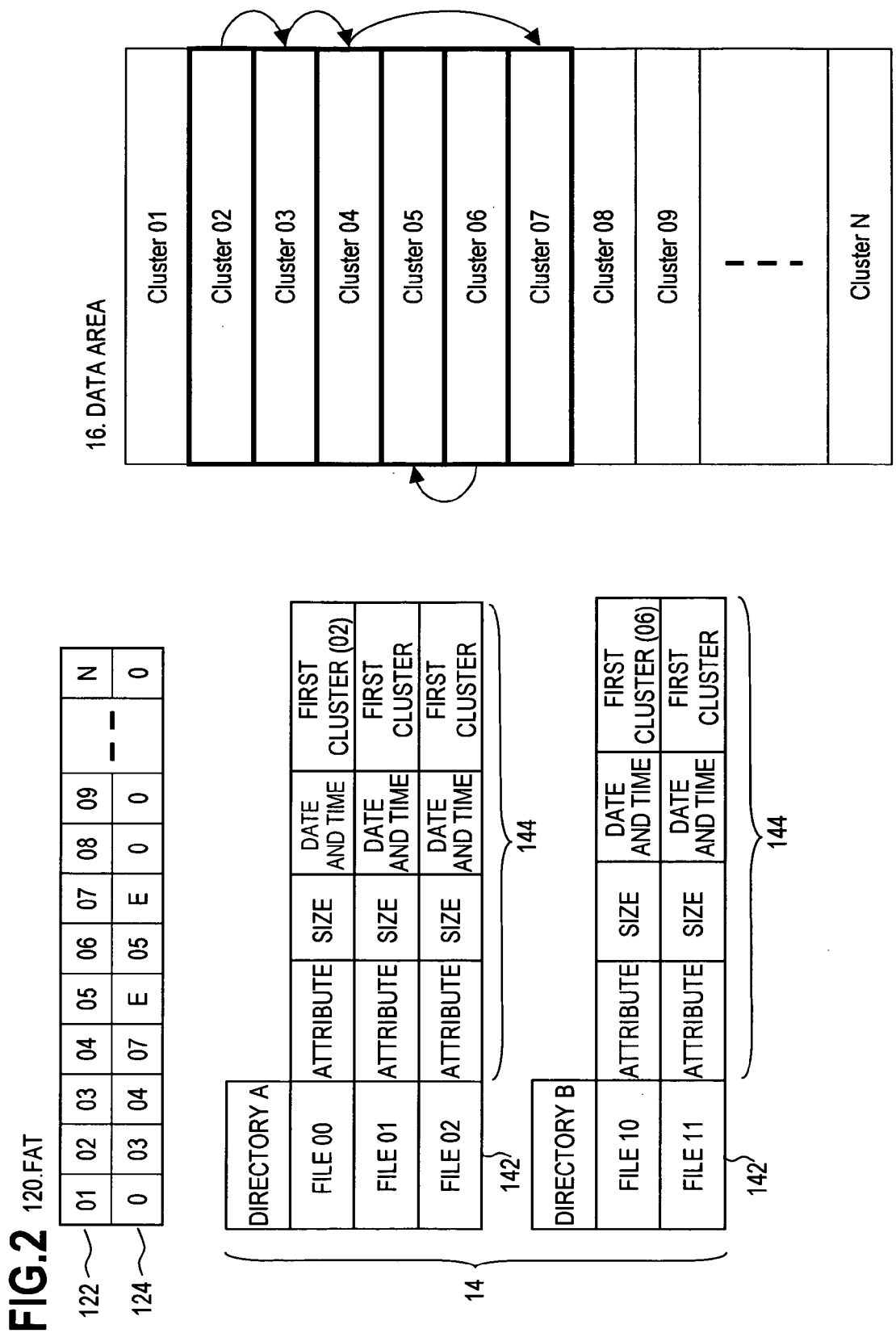
FIG. 2 shows the status inside the recording medium before delete.

FIG. 2 is a diagram depicting the file control of the file system according to the present embodiment, and shows the status inside the recording medium before delete. FIG. 2 shows an example of the FAT area 120, directory area 14 and data area 16 in the recording medium 10. In the directory area 14, directory A and directory B are recorded, where entry information of three files and two files are recorded respectively. The entry information includes the file name 142 and attribute information 144, such as the attribute (e.g. read only), file size, file recording date and time, and first cluster number. In the case of the example in FIG. 2, the entry information of files 00 to 02 is recorded in directory A, and the entry information of files 10 and 11 is recorded in directory B, and the first cluster of the file 00 is "02", and the first cluster of the file 10 is "06".

In FAT 120, the cluster numbers 122 on the top level and the FAT chain information 124 of a corresponding element are recorded. The FAT chain information 124 is one of unused status "0 (or NULL)", the next cluster number such as "03, 04, 07, 05", and the end of the FAT chain "E".

The data area 16 is divided into a plurality of clusters 01 to N, and the data of the file is recorded in one cluster or separately into a plurality of clusters. According to the example in FIG. 2, the first cluster number of the file 00 is "02", so the cluster 02 of FAT 120 is set to be the first cluster, and the data of file 00 is recorded separately into a total of four clusters, that is the first cluster 02 and cluster strings 03, 04 and 07 corresponding to the FAT chain information. In other words, the data is recorded as shown by the arrow marks in the data area 16. In the same way, the first cluster number of the file 10 is "06", so the cluster 06 of the FAT 120 is set to the first cluster, and the data of the file 10 is recorded to the first cluster 06 and the last cluster 05, a total of two clusters.

Therefore when a write request of a file is received, the file system 34 records the entry information of the file into an appropriate directory position, searches the FAT 120 and records the data into a cluster or clusters in unused status, records the first cluster information as the entry information and records the FAT chain information into the FAT 120.

When a read request of a file is received, the file system 34 reads data from a cluster or clusters, where the data of the file is recorded, based on the first cluster of the entry information of the specified file name and the FAT chain information in the FAT. Also in response to a delete request of a file, the file system 34 deletes the entry information with the specified file name, and deletes the FAT chain information as well. In other words, code "0", which indicates unused status, is written in the FAT chain information column 124 of FAT 120. The file system 34 also records the file restoration information in RAM, as mentioned later, so as to support the file restoration requests to be received later.

Figure 3:
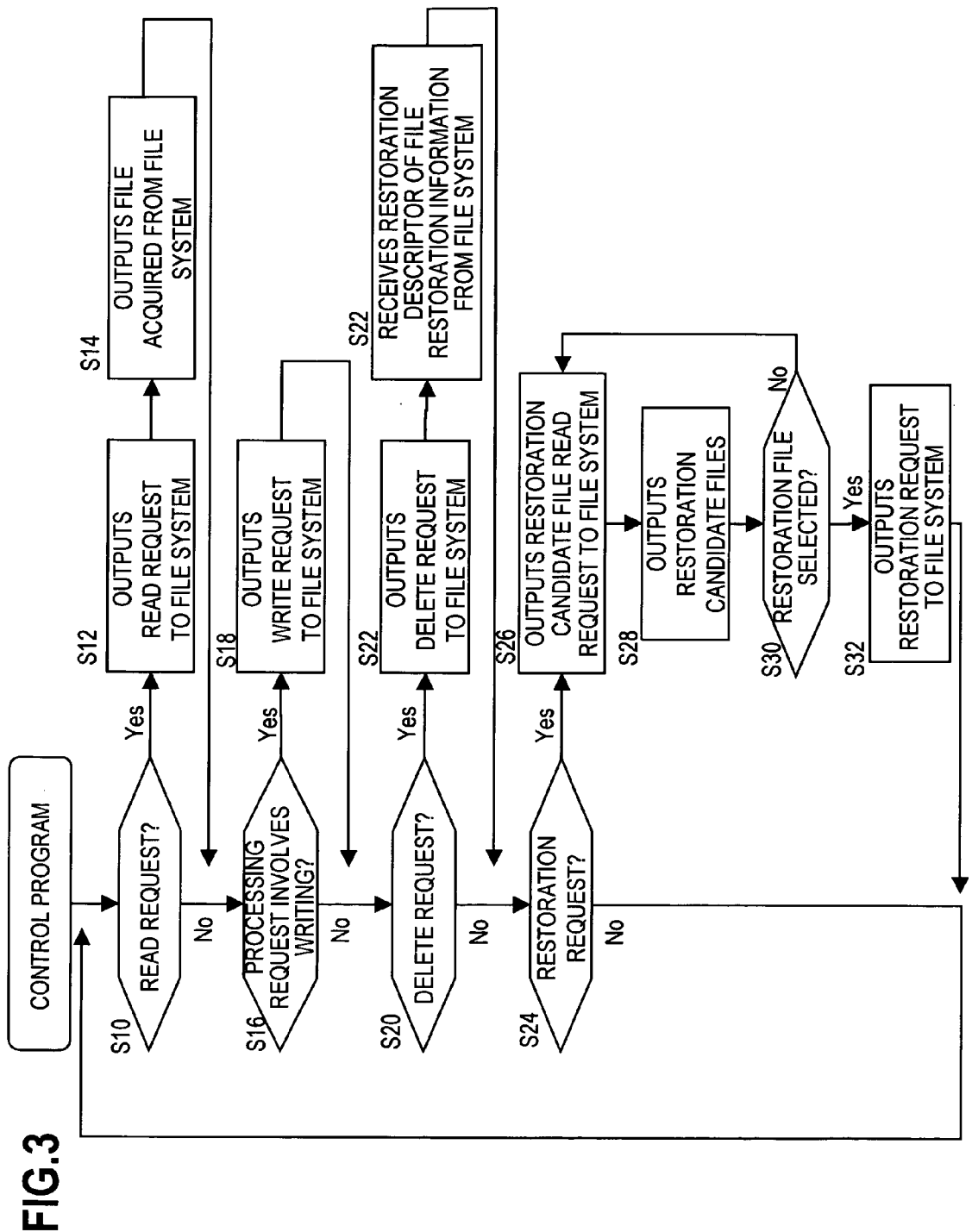
FIG. 3 is a flow chart depicting the procedure of the control program according to the present embodiment.

FIG. 3 is a flow chart depicting the procedure of the control program according to the present embodiment. In FIG. 1, as described above, when a read request is generated from the operation input unit 22 (YES in S10), the control program 32, which is an application program, outputs a read request to the file system 34 (S12), and outputs the data of the file acquired from the file system through the display unit 24 or voice output unit 26 (S14). The read processing of a file by the file system 34 is as described in FIG. 2. When a processing request involving writing is generated (YES in S16), the control program 32 outputs a write request to the file system 34 (S18). The write processing by the file system 34 is as described in FIG. 2.

When a delete request is generated (YES in S20), the control program 32 specifies the file name and outputs a delete request to the file system 34 (S22). Generally in a digital still camera, for example, a deleted file is selected in a state where an image, which is the contents of a file, is displayed on the display unit 24, so the user can input the delete request without recognizing the file name. In response to the delete request, the file system 34 deletes the entry information and FAT chain information in the recording medium 10, as mentioned later, records the file restoration information 42 into the RAM 40, and generates a restoration descriptor with which the file restoration information 42 can be identified. The control program 32 receives the restoration descriptor of the file restoration information from the file system (S22).

And when the restoration request is generated (YES in S24), the control program 32 outputs a read request of the restoration candidate file to the file system (S26). This read request is output with specifying the restoration descriptor. In response to this request, the file system 34 reads the data of the file from the data area 16 based on the file restoration information corresponding to the restoration descriptor, as mentioned later. The control program 32 reproduces the data of the restoration candidate file, which was read, through the display unit or voice output unit (S28). When the restoration file is selected by the user in response to the reproduction (YES in S30), the control program 32 outputs a restoration request of the selected file to the file system (S32). The above steps S26 and S28 are repeated until the restoration file is selected. Therefore the user can specify the restoration file while confirming the contents, without specifying the file name of the restoration file.

Now the file delete unit, file restoration unit and file write unit of the file system will be described in sequence.

[File Delete Unit]

Figure 4:
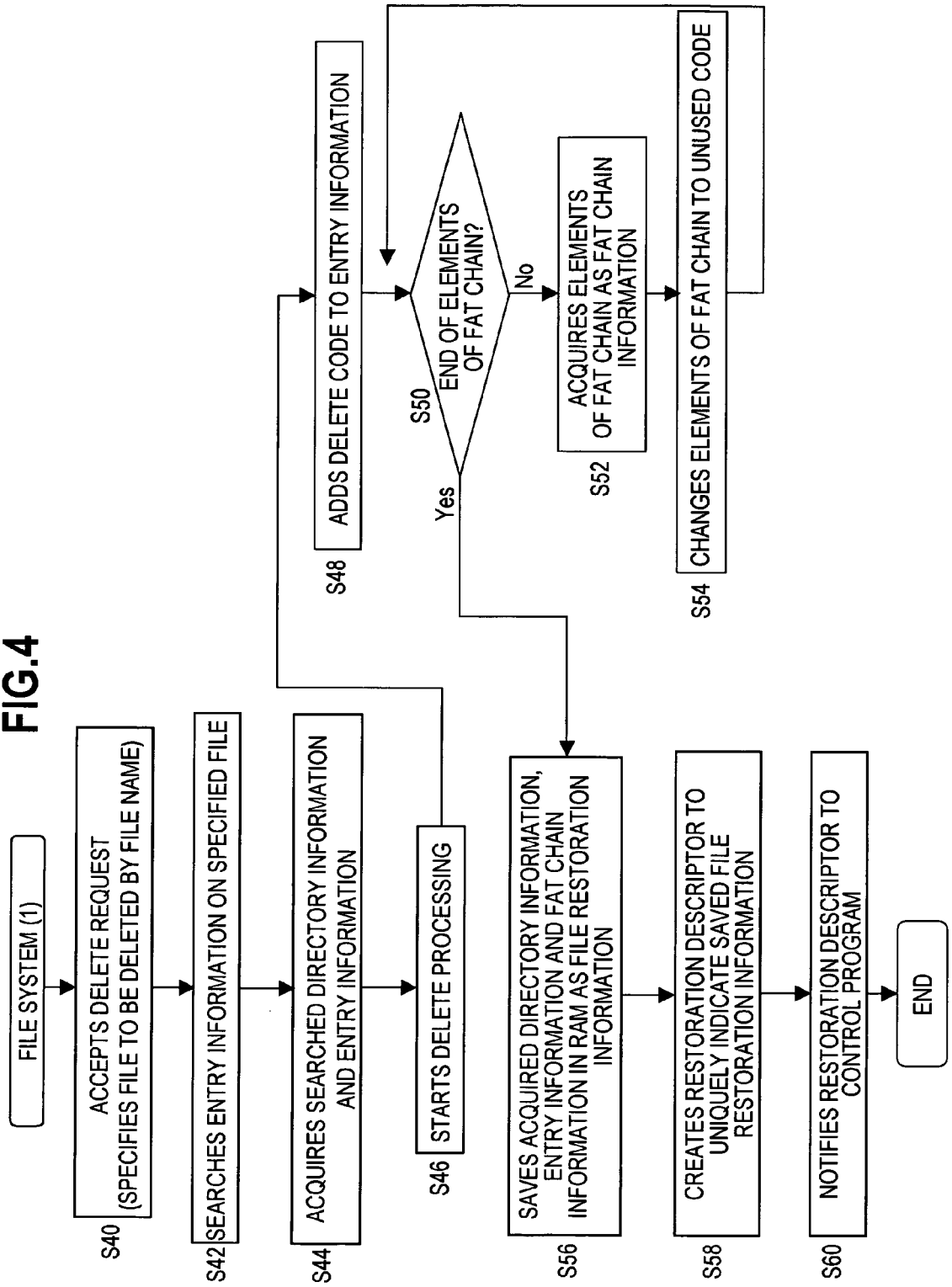
FIG. 4 is a flow chart depicting the delete processing of the file system according to the present embodiment.

FIG. 4 is a flow chart depicting the delete processing of the file system according to the present embodiment. When a delete request, along with a delete target file name, is received from the control program (S40), the file system searches the entry information for the specified delete target file name in the recording medium (S42), acquires the detected entry information and directory information to indicate a position of the directory where the entry information is stored (S44), and starts the following delete processing (S46).

FIG. 5 shows the status in the recording medium after delete. Here it is assumed that the file 00 and file 10 are deleted. As FIG. 4 shows, the file system attaches the delete code 146 to the entry information of the detected file (S48), deletes the "attribute, size, date and time, and first cluster" (148), searches the FAT based on the first cluster of the entry information, and while acquiring the cluster numbers from the first cluster to the last cluster of the FAT chain as the FAT chain information, the file system changes the FAT chain information 124 (cluster number) in the element to the unused code "0" (S50, S52, S54).

By the above delete processing, the delete code 146 is recorded in the entry information of the file 00, as shown in FIG. 5, and "attribute, size, date and time, and first cluster" are deleted (148). The FAT chain information corresponding to the file 00 (information of cluster numbers 02, 03, 04, 07) are all changed to the unused code "0". In the same way, the delete code 146 is recorded in the entry information of the file 10, and "attribute, size, date and time, and first cluster" are deleted (148), and FAT chain information corresponding to the file 10 (information of the cluster numbers 06 and 05) are all changed to the unused code "0". As a result, the information required for maintaining the recording of the files 00 and 10 no longer exists in the directory area 14 and FAT 120. In the cluster in the data area 16, however, data of the original file remains.

The file system records the acquired directory information, entry information and FAT chain information into the RAM as the file restoration information (S56). And generates a restoration descriptor for uniquely identifying the saved file restoration information (S58), and notifies the restoration descriptor to the control program (S60). The restoration descriptor may be an address in RAM, for example.

Figure 6:
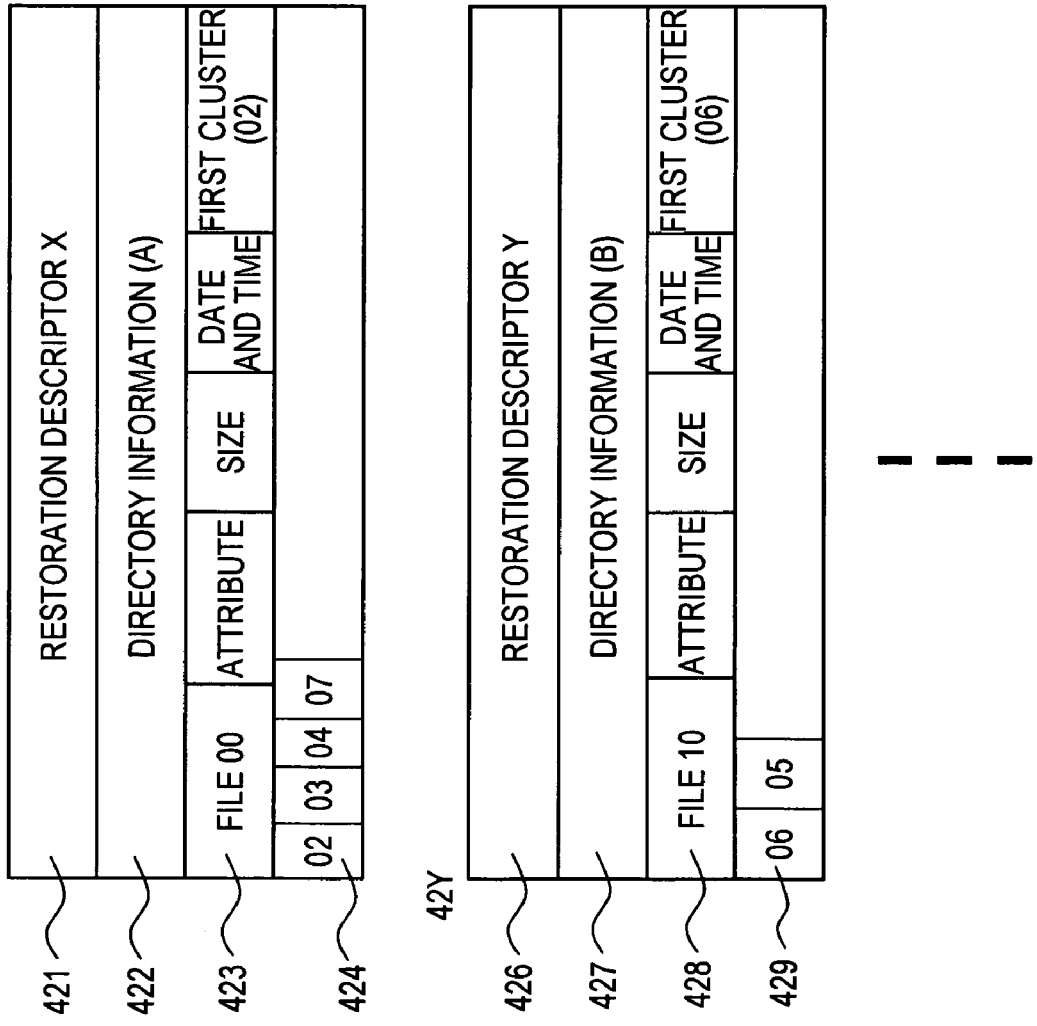
FIG. 6 shows an example of the file restoration information.

FIG. 6 shows an example of the file restoration information. The file restoration information 42X for the file 00 has the restoration descriptor "X" (421) thereof, information "A" to indicate a directory position where the entry information was recorded (422), entry information such as the "file name, attribute, size, date and time, and first cluster" (423), and FAT chain information "02, 03, 04, 07" (424). The file restoration information 42Y for the file 10 also has the restoration descriptor thereof "Y" (426), information "B" to indicate the directory position where the entry information was recorded (427), entry information such as the "file name, attribute, size, date and time, and first cluster" (428), and FAT chain information "06, 05" (429). This file restoration information is recorded in the RAM of volatile memory. However it may be recorded in a non-volatile memory, which is not illustrated. If possible, it may be recorded in the recording medium 10.

[File Restoration Unit]

Figure 7:
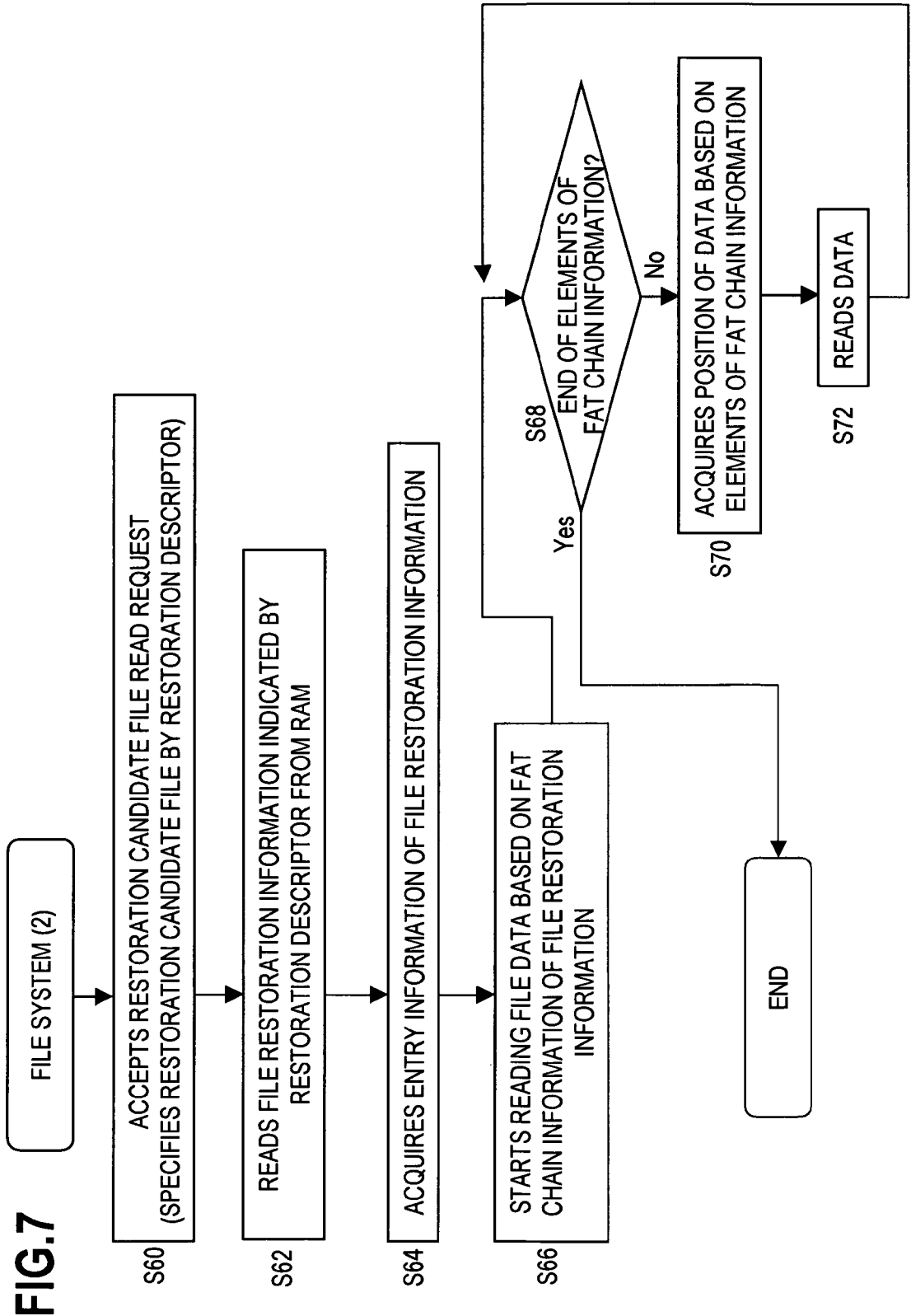
FIG. 7 is a flow chart depicting the processing for a read request to read a restoration candidate file of the file system according to the present embodiment.
Figure 8:
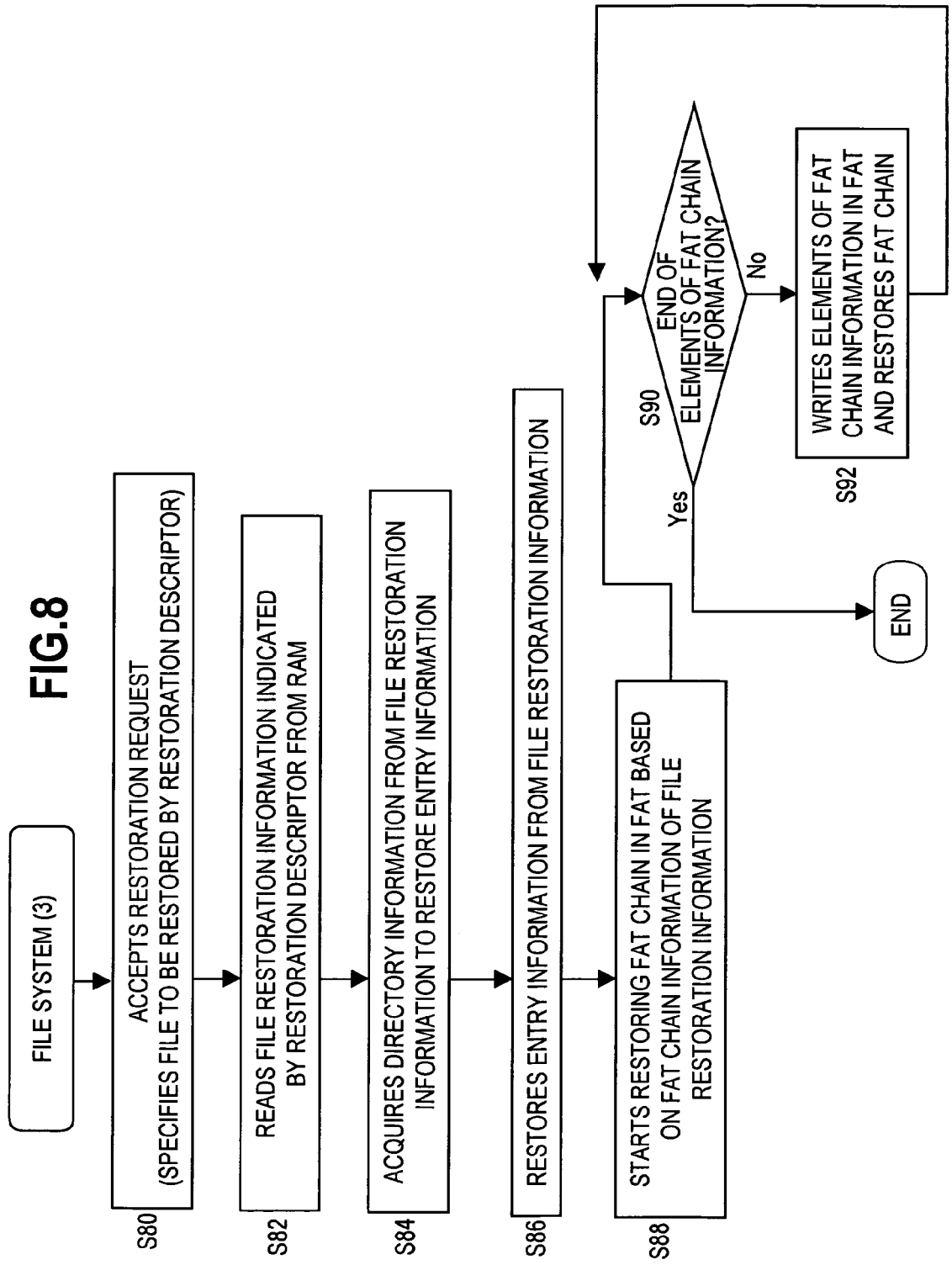
FIG. 8 is a flow chart depicting the restoration processing of the file system according to the present embodiment.

FIG. 7 and FIG. 8 are flow charts depicting the restoration processing of the file system according to the present embodiment. FIG. 7 shows a processing for the read request for a restoration candidate file, and FIG. 8 shows a restoration processing of a file. In FIG. 7, in response to the restoration request from the control program, the file system accepts a read request of a restoration candidate file (S60). The restoration candidate file is specified using the restoration descriptor notified by the control program 32. In response to this, the file system reads the file restoration information 42 indicated by the restoration descriptor from the RAM 40 (S62), and acquires the entry information of the file restoration information (S64).

And based on the FAT chain information of the file restoration information, the file system starts reading the data of the file from the data area 16 of the recording medium 10 (S66). In this reading processing, the file system acquires the cluster number (position) where the data is stored based on the FAT chain information (cluster number string where the data is stored) in the file restoration information (S70), and reads the data of the cluster from the data area 16 (S72). This acquisition of the cluster number and read processing of the data of the cluster (S70, S72) are repeated until the end of the elements of the FAT chain (S68). The data of the restoration candidate file which was read like this is transferred to the control program 32, and as described in FIG. 3, the data is reproduced and output through the display unit 24 and voice output unit 26, and selection by the user is prompted.

Then in FIG. 8, when the user selects a restoration file and the restoration request is generated by the control program based on the restoration descriptor (S80), the file system reads the file restoration information 42 indicated by the restoration descriptor from the RAM 40 (S82), acquires the directory information from the file restoration information to restore the entry information in the recording medium 10 (S84), and records and restores the entry information of the file restoration information 42 at a position of the directory information in the directory area of the recording medium 10 (S86). And the file system starts restoring the FAT chain in the FAT based on the FAT chain information of the file restoration information (S88).

In this restoration of the FAT chain, the file system writes the elements (cluster numbers) of the FAT chain information at the corresponding positions of the FAT 120, and restores the FAT chain (S90, S92). In other words, the file system writes the cluster numbers of the FAT chain information into the elements of the preceding cluster numbers in the FAT. By this, the next cluster number is written in the element of each cluster of FAT. And in the element of the FAT corresponding to the last cluster number of the FAT chain information, the end code "E" is written. By this, the FAT chain for the restoration file is restored in the FAT area 120 of the recording medium 10.

As described above, when a restoration request is generated, the file system reads the data of the restoration candidate file based on the file restoration information, and transfers it to the control program, so that the user can select the restoration file based on the contents of the data of the deleted file. And for this selected restoration file, the file system restores the entry information and restores the FAT chain in the recording medium based on the file restoration information.

[File Write Unit]

Figure 9:
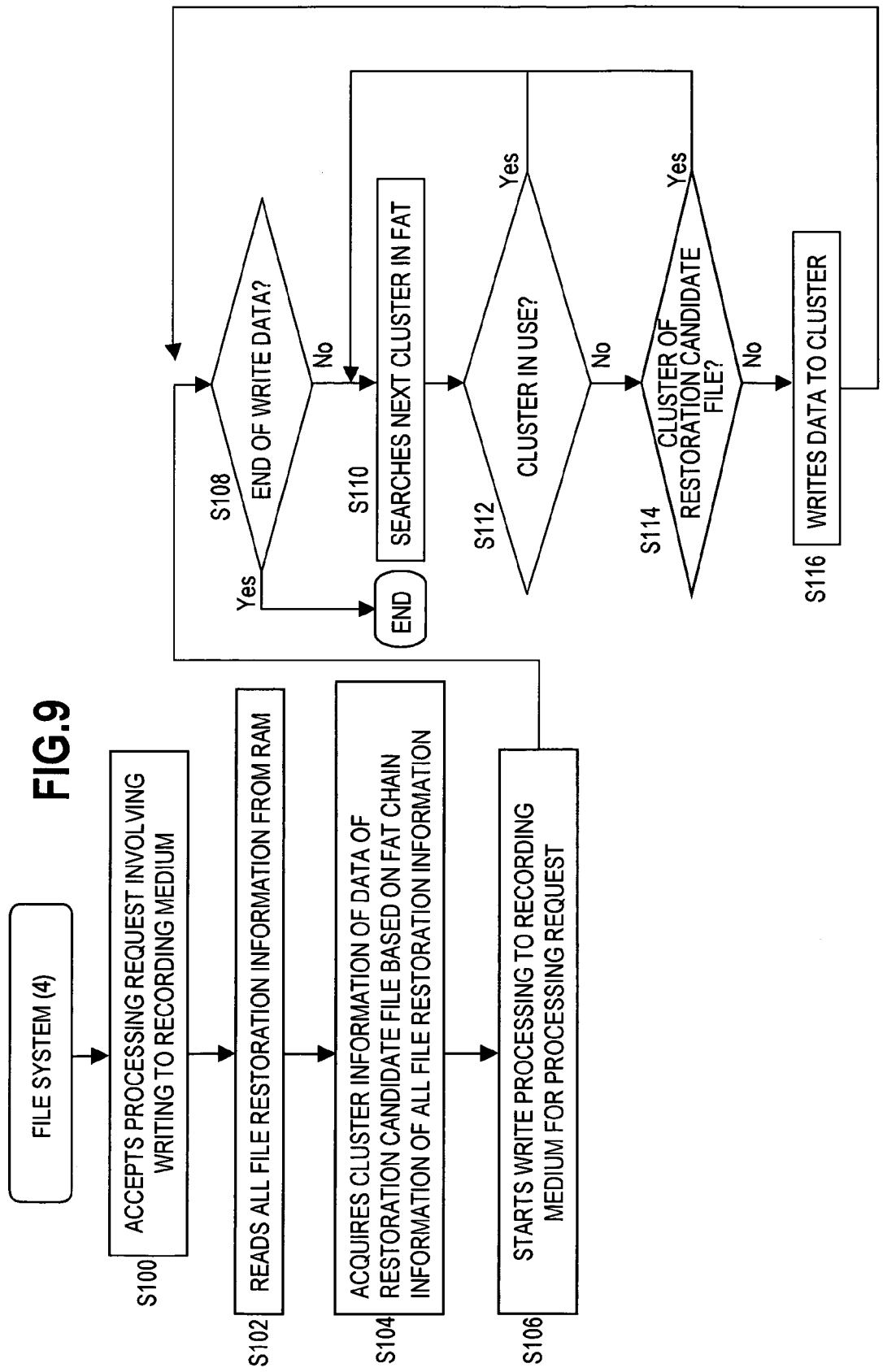
FIG. 9 is a flow chart depicting the write processing of the file system according to the present embodiment.

FIG. 9 is a flow chart depicting the write processing of the file system according to the present embodiment. In the present embodiment, in response to the generation of a restoration request of a file, the file system reads the data of the restoration candidate file, reproduces and outputs it by the control program, and enables the selection of the restoration file based on the contents. In the file delete processing, the data is not deleted from the data area 16 of the recording medium 10, but the entry information and FAT chain information are deleted from the recording medium 10. Therefore if a processing request involving writing is generated between the file delete processing and file restoration request, new data may be overwritten in the cluster of the data area where the data of the restoration candidate file is stored.

Therefore in the write processing in FIG. 9, if a processing request involving writing the recording medium is accepted, the file system detects an unused cluster by referring to the FAT in the recording medium, and also checks the FAT chain information of the file restoration information 42 in the RAM 40, to confirm whether the unused cluster is a cluster of the restoration candidate file. And writes the new data in a cluster which is an unused cluster of the FAT, and is not a cluster of the restoration candidate file.

In other words, when a processing request involving writing the recording medium is received (S100), the file system reads all the file restoration information from the RAM 40 (S102), and based on this FAT chain information, acquires cluster information where the data of the restoration candidate file is stored (S104), and starts write processing to the recording medium for the processing request (S106).

In the above write processing, for the write data (S108), the file system searches the cluster in the FAT of the recording medium 10 (S110), checks whether this cluster is in use or not by the elements of the FAT (S112), and if it is an unused cluster, the file system checks whether the cluster is a cluster of the restoration candidate file or not using the cluster information of the restoration candidate file acquired in step S104 (S114). And if the cluster is an unused cluster in the FAT and is not a cluster in the restoration candidate file (NO in S112 and NO in S114), the file system writes the write data into the cluster (S116). If the searched cluster is a cluster in use in the FAT or a cluster of the restoration candidate file (YES in S112, or YES in S114), the file system does not write data to this cluster, but searches the next cluster in the FAT (S110).

As described above, according to the present embodiment, if a processing request involving writing the recording medium is received, the file system checks whether this cluster is an unused cluster based on the FAT, and also confirms that this cluster is not a cluster of the FAT chain information of the file restoration information, and new data is written to this cluster only when both conditions are met. Therefore, at least as long as the file restoration information is stored in the RAM, another data is not overwritten in the cluster storing the data of the restoration candidate file.

Also in the above embodiment, the file restoration information 42 is recorded in the RAM 40 of the volatile memory, so at least during this power ON period, the file can be restored. And when the power ON period ends, the file restoration information 42 is lost, and the file can no longer be restored. Also when a file delete is requested, the entry information and FAT chain of the FAT in the recording medium 10 are deleted, so when the power ON period ends, the capacity of the deleted file data in the recording medium turns into a capacity where new writing is possible, so unlike a "recycle bin", a continuous increase in actual capacity being used in the recording medium 10 can be prevented.

In the above case, the file restoration information 42 may be stored in a non-volatile memory, so that the file restoration information is deleted after a predetermined period, set by the user, elapses, then the user can set the level of relief in case the file is deleted in error.

In the above embodiment, a FAT chain is recorded in the FAT as the file data area information to indicate the cluster when the data of a file is recorded. However, it is obvious that the present embodiment can be applied if the file data area information, to indicate the cluster in which the data of the file is recorded, is recorded in the data area management table, even if it is a management table in a format other than FAT.

What is claimed is:

1. A file management device for managing data of a file comprising:
   a processor;
   a memory embedded with executable instructions executed by the processor, the executable instructions configured to be implemented by the file management device including:
   a file write unit which, in response to a write request of a file, records data of the file to be written, into one or a plurality of cluster areas of a recording medium, records file information having at least a file name and attribute information of the written file into a directory area of said recording medium, and records file data area information of the written file to indicate a cluster or clusters, in which the data of said file is recorded, into a data area management table of said recording medium;
   a file delete unit which, in response to a delete request of a file, stores file restoration information having file information and file data area information corresponding to the deleted file, into a memory area, sends back a restoration descriptor for identifying said stored file restoration information of the deleted file to said control system, and deletes said file information and said file data area information corresponding to the deleted file in said recording medium; and
   a file restoration unit which, in response to a restoration request, reads data of at least one deleted file from said recording medium based on file restoration information corresponding to restoration descriptor of the at least one deleted file, sends the read data of the at least one deleted file back to said control system for displaying, receives a selection of a restoration file from displayed data, and restores file information and file data area information of the selected restoration file in said recording medium based on file restoration information corresponding to the selected restoration file.

2. The file management device according to claim 1, wherein said memory area is a volatile memory which maintains storage of data during power ON period, and said recording medium is a non-volatile memory which maintains storage of data even if power is turned OFF, and said file restoration unit restores only files deleted during power ON period.

3. The file management device according to claim 2, wherein in response to a write request, said file write unit searches file data area information of said data area management table and the file data area information of said file restoration information, and writes the data of a write request target file into a cluster which is an unused cluster in said data area management table and in which the data of said deleted file is not written.

4. The file management device according to claim 2, wherein said file restoration information further comprises a directory position information of the file information of a delete target file, and said file restoration unit restores said file information at a position in said directory area, which corresponds to the directory position information of said file restoration information.

5. The file management device according to claim 3, wherein said file write unit detects a cluster, which is an unused cluster in said data area management table and in which the data of said deleted file is not written, based on said file data area information in said data area management table and file data area information of said file restoration information.

6. The file management device according to claim 3, wherein said file restoration information further comprises a directory position information of the file information of a delete target file, and said file restoration unit restores said file information at a position in said directory area, which corresponds to the directory position information of said file restoration information.

7. The file management device according to claim 1, wherein in response to a write request, said file write unit searches file data area information of said data area management table and the file data area information of said file restoration information, and writes the data of a write request target file into a cluster which is an unused cluster in said data area management table and in which the data of said deleted file is not written.

8. The file management device according to claim 7, wherein said file write unit detects a cluster, which is an unused cluster in said data area management table and in which the data of said deleted file is not written, based on said file data area information in said data area management table and file data area information of said file restoration information.

9. The file management device according to claim 7, wherein said file restoration information further comprises a directory position information of the file information of a delete target file, and said file restoration unit restores said file information at a position in said directory area, which corresponds to the directory position information of said file restoration information.

10. The file management device according to claim 1, wherein said file restoration information further comprises a directory position information of the file information of a delete target file, and said file restoration unit restores said file information at a position in said directory area, which corresponds to the directory position information of said file restoration information.

11. The file management device according to claim 1, wherein said file is image data, and a file name of said file is automatically assigned by said control system.

12. The file management device according to claim 1, wherein said restoration descriptor is an address in said memory area.

13. The file management device according to claim 1, wherein said memory area is a non-volatile memory which maintains recorded data even if the power is turned OFF, and said file restoration information is deleted after a predetermined period is elapsed.

14. An electronic equipment comprising:
a control system for controlling an application;
a file management device for managing data of a file in response to a request from said control system,
said file management device having a processor configured to execute instructions and said file management device including:
a file write unit which, in response to a write request of a file, records data of the file to be written, into one or a plurality of cluster areas of a recording medium, records file information having at least a file name and attribute information of the written file into a directory area of said recording medium, and records file data area information of the written file to indicate a cluster or clusters, in which the data of said file is recorded, into a data area management table of said recording medium;
a file delete unit which, in response to a delete request of a file, stores file restoration information having file information and file data area information corresponding to the deleted file, into a memory area, sends back a restoration descriptor for identifying said stored file restoration information of the deleted file to said control system, and deletes said file information and said file data area information corresponding to the deleted file in said recording medium; and
a file restoration unit which, in response to a restoration request, reads data of at least one deleted file from said recording medium based on file restoration information corresponding to restoration descriptor of the at least deleted file sends the read data of the at least one deleted file back to said control system for displaying, receives a selection of a restoration file from displayed data, and restores file information and file data area information of the selected restoration file in said recording medium based on file restoration information corresponding to the selected restoration file.

15. The electronic equipment according to claim 14, wherein said file management device automatically assigns said file name in response to said write request, and includes the file name in said file information.

16. The electronic equipment according to claim 15, wherein said memory area is a volatile memory which maintains storage of data during power ON period, and said recording medium is a non-volatile memory which maintains storage of data even if power is turned OFF, and said file restoration unit restores only files deleted during power ON period.

17. The electronic equipment according to claim 14, wherein said memory area is a volatile memory which maintains storage of data during power ON period, and said recording medium is a non-volatile memory which maintains storage of data even if power is turned OFF, and said file restoration unit restores only files deleted during power ON period.

18. A computer implemented method of managing data of a file, comprising:
recording, by a computer system, data of a file into one or a plurality of cluster areas of a recording medium in response to a write request to the file;
recording file information having at least a file name and attribute Information of the written file into a directory area of said recording medium;
recording file data area information of the written file to indicate a cluster or clusters, in which the data of said file is recorded, into a data area management table of said recording medium;
storing file restoration Information, in response to a delete request to a file, having file information and file data area information corresponding to the deleted file, into a memory area;
sending back a restoration descriptor for identifying said stored file restoration information of the deleted file to said control system;
deleting said file information and said file data area information corresponding to the deleted file in said recording medium;
reading data of at least one deleted file, in response to a restoration request, from said recording medium based on file restoration information corresponding to restoration descriptor of the at least one deleted file;
sending the read data of the at least one deleted file back to said control system for displaying;
receiving a selection of a restoration file from displayed data; and
restoring file information and file data area information of the selected restoration file in said recording medium based on file restoration information corresponding to the selected restoration file.

* * * * *